United States Patent

Foster

[15] 3,703,708

[45] Nov. 21, 1972

[54] MEMORY EXPANSION ARRANGEMENT IN A CENTRAL PROCESSOR

[72] Inventor: James Harold Foster, Jasper, Ontario, Canada

[73] Assignee: GTE Automatic Electric Laboratories Incorporated, Northlake, Ill.

[22] Filed: May 12, 1971

[21] Appl. No.: 142,649

[52] U.S. Cl. ................................................ 340/172.5

[51] Int. Cl. ................................................ G11c 7/00

[58] Field of Search ............................ 340/172.5, 174

[56] References Cited

UNITED STATES PATENTS

| | | | |
|---|---|---|---|
| 3,587,070 | 6/1971 | Thomas | 340/172.5 |
| 3,553,653 | 1/1971 | Krock | 340/172.5 |
| 3,387,283 | 6/1968 | Snedaker | 340/172.5 |

*Primary Examiner*—Gareth D. Shaw

*Attorney*—K. Mullerheim, B. E. Franz and Theodore C. Jay, Jr.

[57] ABSTRACT

The memory is divided into a program block and a data block with identical addresses for the two blocks, and a "paging" technique is used to select the appropriate block. The computer has an operation cycle for the execution of each instruction, the cycle being divided into intervals designated bit times. The first bit time of each cycle is used to read a program instruction word, and for some of the instructions a given other bit time of the cycle is used to read the contents of the operand address of the instruction. The paging technique comprises always reading a word from the program block during the first bit time, and during the other given bit times, for those instructions requiring reading the contents of the operand address, selecting either the program block or the data block depending upon the operation code. This permits operand addresses designating literals to be in the program block, while the principal data base is placed in the data block. In particular a transfer instruction does not have an operand address, but is used to take an address from the accumulator and read the contents thereof from the data block. To permit a similar operation for words in the program block, for example during a memory dump, a fetch instruction produces operations identical to those of the transfer operation, except that the contents of the address in the accumulator are obtained from the program block.

13 Claims, 10 Drawing Figures

INVENTOR
JAMES H. FOSTER
BY Bernard E. Franz
ATTORNEY

MEMORY EXPANSION ARRANGEMENT IN A CENTRAL PROCESSOR

BACKGROUND OF THE INVENTION

1. Field of the Invention

This invention relates to a memory expansion arrangement in a central processor, and more particularly to an arrangement for increasing the number of words available for the program with a small computer.

2. Description of the Prior Art

In the design of computer systems the maximum size of the memory is determined and sufficient bits in an address field of the instructions is allocated to designate addresses up to the maximum value. It frequently happens that at a later time the estimate of the maximum size for memory proves to be insufficient. It is then impractical to increase the number of bits in the address field of instructions. Therefore many different paging techniques have been devised which permit the memory to be divided into blocks or fields, with identical addresses being used in the different blocks. Many of these techniques require lengthening the address register in the hardware of the system, and then using special instructions to modify certain bits of the address register while the other bits are obtained from the usual address field of the instructions. However there are some disadvantages to this technique, in that it complicates the programming particularly in using common data, and in branching from one portion of the program to another. While such a technique may be useful for a large computing system, it would be inconvenient with a small computer.

SUMMARY OF THE INVENTION

An object of this invention is to provide an arrangement for expanding the memory in a small computing system, without requiring any modification of the address register, or requiring lengthening the size of program routines.

The invention is incorporated into a computer system in which each operation cycle is divided into intervals designated bit times, with the first bit time of each cycle used to read a program word from memory, and for certain operation codes another given bit time is used to read the contents of an address comprising the operand of the instruction.

According to the invention, the memory is divided into a program block and a data block with identical addresses, the program block is selected during the first bit time of each operation cycle to select a program instruction word, and for those instructions requiring reading the contents of an address from memory, the program block or the data block is selected depending upon the operation code.

Further according to the invention, a transfer operation code designates that the contents of an address in the accumulator are to be obtained from the data block and placed into the accumulator. A fetch operation code is added to permit a similar operation to take an address from the accumulator and read the contents thereof from the program block.

CROSS-REFERENCES TO RELATED APPLICATIONS

This invention is related to Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits SR for reading from temporary memory stores is disclosed in the U.S. patent application Ser. No. 883,062 filed Dec. 8, 1969 now U.S. Pat. No. 3,587,070 issued June 22, 1971 by R. M. Thomas for a Memory Arrangement Having Both Magnetic-Core and Switching-Device Storage with a Common Address Register, hereinafter referred to as the Memory Arrangement application. A U.S. patent application Ser. No. 51,256 filed June 30, 1970 now U.S. Pat. No. 3,618,015 issued Nov. 2, 1971 by H.P. Homonick for Apparatus for Discriminating Between Errors and Faults, hereinafter referred to as the Fault Buffer application, discloses circuit details of some of the logic circuits shown herein by functional block diagrams. The switching network is disclosed in U.S. patent application Ser. No. 54,138 filed July 18, 1970 now U.S. Pat. No. 3,624,305 issued Nov. 30, 1971 by G. Verbaas for a Communication Switching Network Hold and Extra Control Conductor Usage, hereinafter referred to as the Switching Network application. Some of the apparatus disclosed herein is covered by the following U.S. patent applications: Ser No. 102,414, filed Dec. 29, 1970 by J. P. Dufton and B. G. Hallman for Computer Having Associative Search Apparatus; Ser. No. 102,462 filed Dec. 29, 1970 by J. P. Dufton and J. H. Foster for Shift Apparatus for Small Computer; Ser. No. 102,413 filed Dec. 29, 1970 by R. M. Thomas and B. G. Hallman for Indirect Addressing Apparatus for Small Computer.

DETAILED DESCRIPTION

Figure 1:
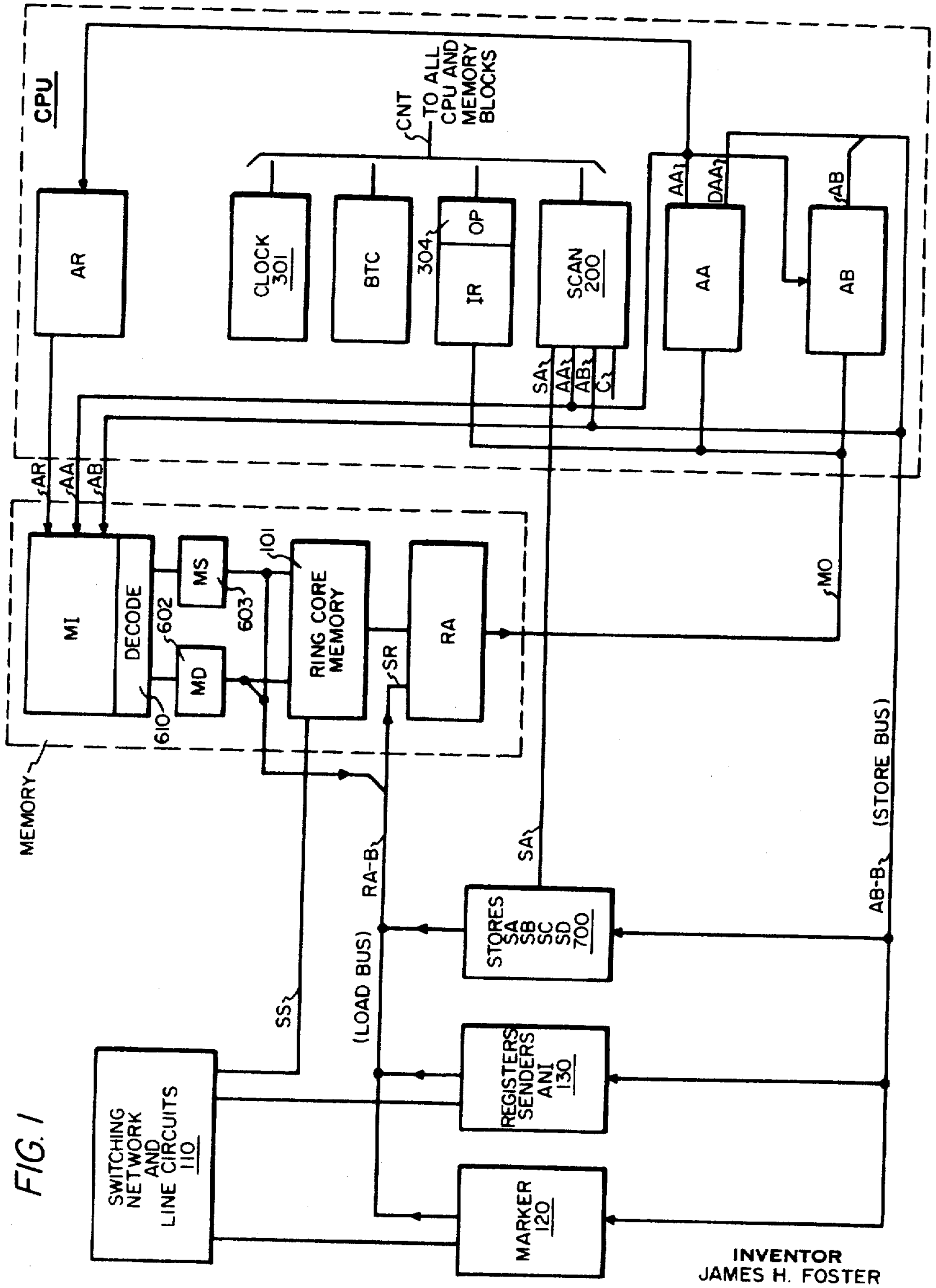
FIG. 1 is a block diagram of a telephone switching system, showing particularly the central processing unit, the memory, and subsystems which include temporary memory registers.

As shown in the block diagram of FIG. 1, the data processing system includes a memory and a central processing unit CPU. The central processing unit includes a clock 301 for supplying the basic timing signals, a bit time counter BTC which supplies the signals for the operation cycle for each instruction, an instruction register IR with an operation code (OP) decoder 304 which supplies the operation code for controlling the logic circuits, accumulator registers AA and AB, an address register AR and a SCAN unit 200.

The memory subsystem comprises basically a ring-core memory 101, with a memory input register MI having decoding circuits 610 for supplying input signals to memory drivers 602 and memory switches 603, and output read amplifiers RA. Storage registers (SA, SB, SC and SD) 700 may be considered to be part of the central processing unit, and are connected to the memory drivers and memory switches, and to the read amplifiers to form a portion of the temporary memory for the system.

The data processing system forms part of a telephone switching system to control a switching network and line circuits 110. A marker 120 contains registers forming part of the temporary memory of the system, and has circuits for controlling the switching network 110. The system also includes registers, senders and ANI (Automatic Number Identification) units 130 which also include registers forming part of the temporary memory, and have connections to the switching network 110.

Figure 6:
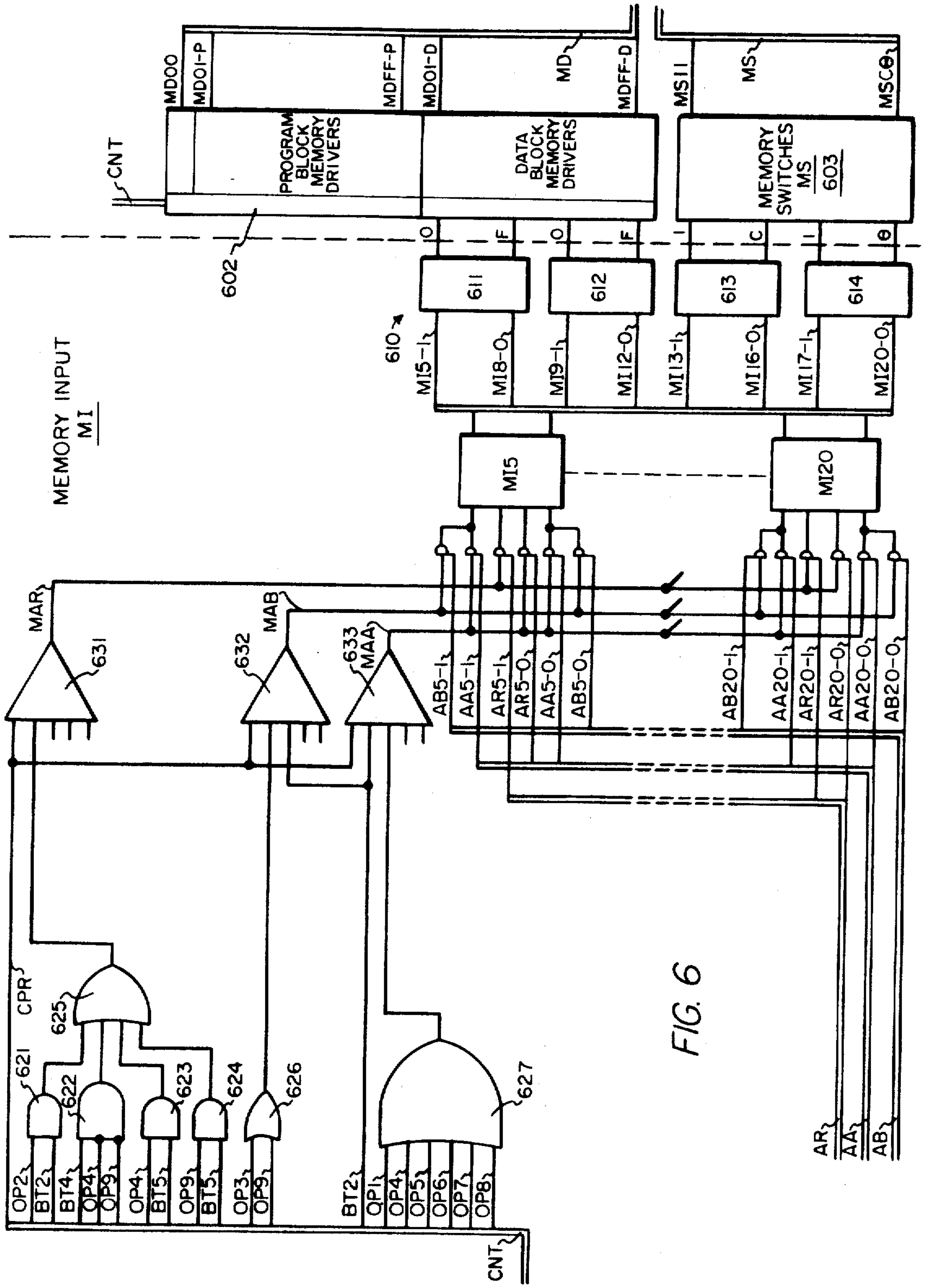
Figure 7:
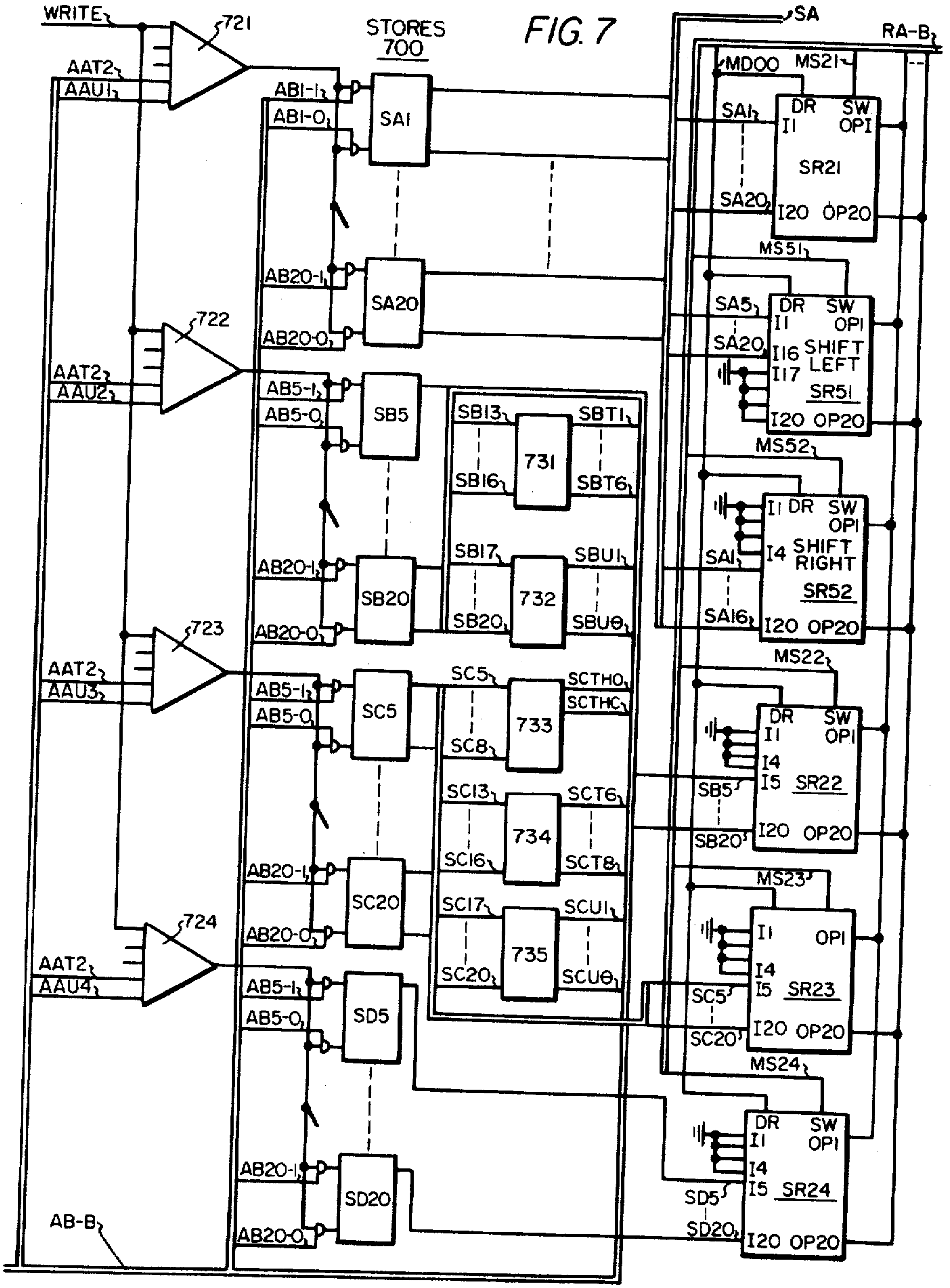

The arrangement shown in FIG. 1 represents a modification of the Small Exchange Stored Program Switching System disclosed in said Duthie et al patent. In that patent the central processing unit is shown in FIGS. 6 and 7. The clock 301, bit time counter BTC and instruction register 303 with decoder 304 shown herein correspond to the clock 601, bit time counter 602, instruction register flip-flops IR1–4 and OP code decoder 605 shown in the patent. The address register AR corresponds to the current address counter comprising flip-flops CAC5–20 in the patent. The accumulator AA herein replaces the memory output register flip-flops MOR1–20 and the address portion IR5–20 of the instruction register of the patent. The accumulator AB herein corresponds generally to the accumulator flip-flops ACC1–20 and associated arithmetic circuits in FIG. 7 of the patent. The memory input register MI and decoding circuits 610 correspond generally to the circuits shown in FIG. 2 of the patent. The modifications of the memory output circuits as used in the system of FIG. 1 herein are disclosed in detail in the said memory arrangement patent application by Thomas. There are detailed modifications of all of the circuits of FIG. 1 with respect to those disclosed in the Duthie et al patent.

The basic logic circuits used herein are generally the same as those disclosed in the Duthie et al patent. The logic levels are a negative 8 volts for "1", and ground potential for "0." An open circuit is also used for the logic level "1," the output of a logic module generally being from the unbiased collector electrode of a transistor which is in the cutoff condition for the "1" state, and the negative biasing potential being supplied at the inputs of the succeeding logic modules. The clock pulses as now used in the system comprise trains of negative pulses, which are a train of pulses on the lead CPM (FIG. 3) of three microseconds duration recurring every ten microseconds and a train of pulses on lead CPR of 0.7 microseconds, with the leading edge of the CPR pulses occurring in coincidence with the trailing edges of the CPM pulses. The actual logic circuits as used in the system are principally NOR gates, but are disclosed herein as AND and OR gates to improve the clarity. As stated at column 5 of the Duthie et al patent, some of the building block circuits are disclosed in U.S. Pat. No. 3,173,994, FIG. 21. The symbols for the AND and OR gates as used herein have been changed to conform to current practice. Referring for example to FIG. 4, block 413 represents an AND gate and block 415 represents an OR gate, with a circle at an input or output as shown for example at gate 414 representing an inversion or inhibit function. The gated pulse amplifier circuits such as 411 are generally similar to circuit 201 shown in FIG. 5 of the Duthie et al patent, except for the number of DC control inputs. The upper input of the circuit is an AC clock pulse input and the lower four inputs are DC control inputs connected as an AND function. Therefore when all four of the inputs are at the logic level "1" or open circuited a clock pulse at the upper input is gated and amplified to the output. The various decoding circuits generally comprise AND gates such as that shown in block 511 of the Duthie et al patent. The flip-flops such as AR5 have a number of set inputs shown on the left side on the upper half and a number of reset inputs shown on the left side on the lower half. Each input is from a coincidence gate represented by a small semicircle on which the input at the center left is an AC clock input and the input from the top or bottom of the left side is a DC control input, with the DC input required to be present for a certain time before the occurrence of the clock pulse input to be effective to change the state of the flip-flop.

There are several gates and gated pulse amplifiers actually used in the system, not shown herein, which are used for amplification and distribution of the signals. For example the busses include several such gating circuits to different groups of units, and also separately to odd and even numbered units for reliability. Thus connections disclosed and claimed herein, while shown as simple conductors, may in actual practice include circuits which repeat the signals.

A memory word comprises 20 bits organized as five digits of four bits each. For instruction words, the first digit is the operation code and the other four digits are an operand address.

The operation codes (OP codes) with their assembler mnemonics are as follows:

LOAD (OP 1) - read the contents of the operand memory address location and place the result in the accumulator AB.

STORE (OP 2) - write the contents of the accumulator AB into the operand memory address location.

TRANS (OP 3) - transfer the contents of the address location stored in the accumulator AB into the accumulator AB. (The operand part of the instruction is blank).

COMP (OP 4) - compare the contents of the accumulator AB with the contents of the operand address location as read into accumulator AA. If equal, proceed to the next instruction in sequence by incrementing the address register by 1 as normal. If unequal, skip one address in the program.

ADD (OP 5) - add 1, 10 or 100 (literals stored at operand address location) to the contents of the accumulator AB.

BR (OP 6) - branch to the instruction at the operand address location.

MASK (OP 7) - mask the contents of the accumulator AB with the contents from the operand address location as read into accumulator AA. Keep the digit where one's are present and set to zero where zero's are present (logical AND).

SUPER (OP 8) - superimpose on the accumulator AB the contents of the operand memory address as read into accumulator AA (logical OR).

SCAN (OP 9) - make an associative search beginning with the address in the accumulator AB. (The operand part of the instruction is blank). When the contents of the accumulator AA compare with the contents of the storage register SA, the search is completed and the next address is used. When the contents of accumulator AB and a wired constant C compare, skip one address in the program. Note that the necessary data must be placed in the register SA and the accumulator AB before this OP code is called upon.

Figure 2:
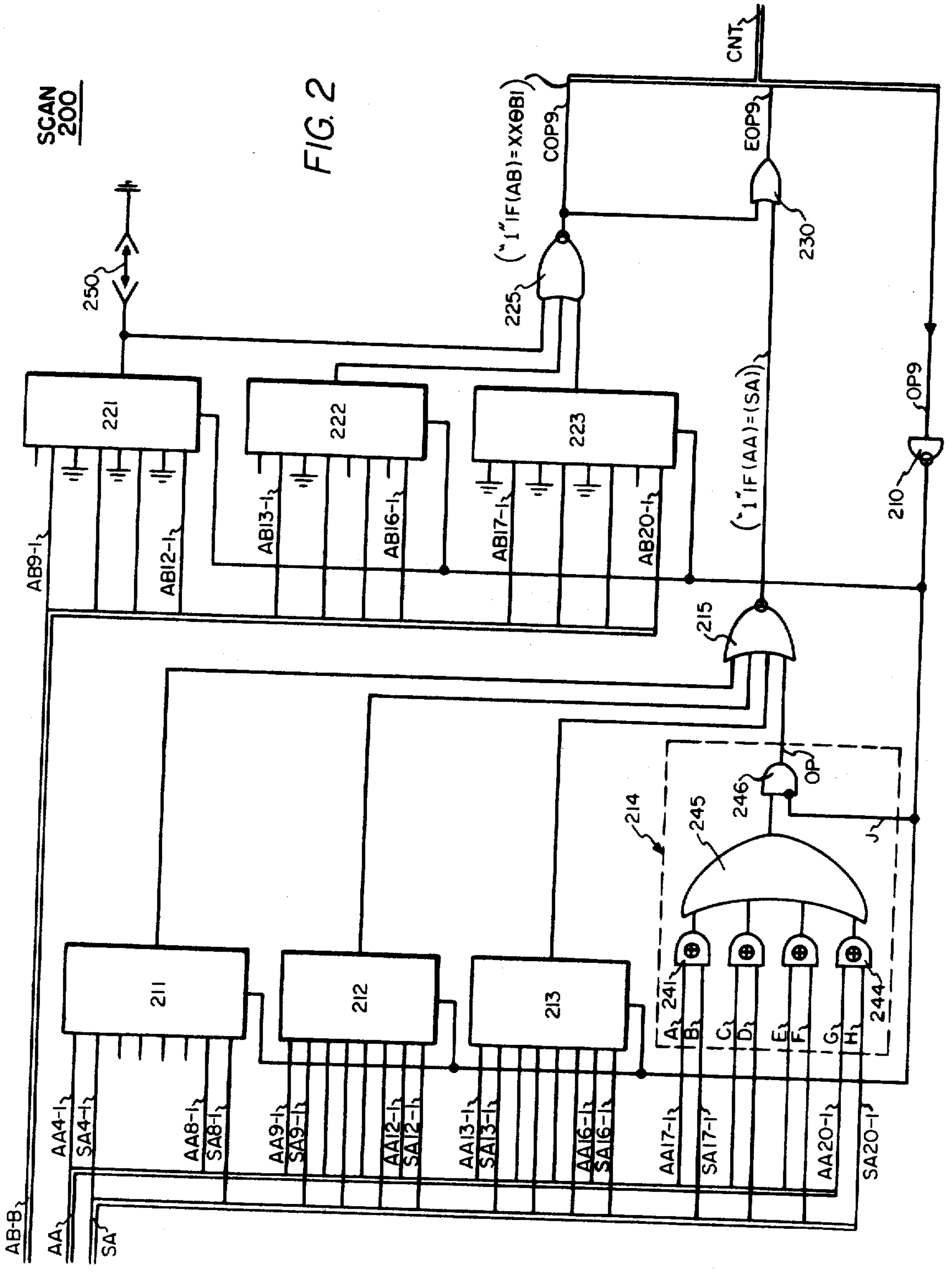
FIG. 2 is a functional block diagram of the comparators used for the operation code SCAN.

The comparison circuits for the SCAN operation are shown in FIG. 2. The basic comparison modules 211–214 and 221–223 each provide for comparing one set of four inputs to a corresponding set of four inputs. These modules may be of the type disclosed in U.S. Pat. No. 3,478,314 by W. R. Wedmore for a Transistorized Exclusive-OR Comparator. Block 214 is a symbolic functional equivalent of the module. It includes four exclusive OR gates 241–244, followed by an OR gate 245 and an output inhibit AND gate 246 to the output conductor OP. Each of the exclusive OR gates comprises a transistor with the two inputs connected via resistance and diode bias circuits to the base and emitter electrodes, the collector electrodes of the four transistors are connected together at a common point, and thence through a resistance-capacitance network to the base electrode of an output transistor, and the collector electrode of this last transistor is connected to the output lead OP. Another input from a terminal J is connected through a resistance network to the base electrode of the output transistor to act as an inhibit input. The Boolean equation for the Wedmore circuit or for the generally equivalent logic of block 214 is:

$$OP = \bar{J}\,(A\bar{B} + \bar{A}B + C\bar{D} + \bar{C}D + E\bar{F} + \bar{E}F + G\bar{H} + \bar{G}H)$$

The outputs of the four comparator modules 211–214 are connected to respective inputs of a NOR gate 215. The J inputs of the four modules are connected in common to the same source. The result is that if the logic level at input J is "0" and the signals on two sets of inputs compare so that each signal in one set is equal to its respective signal in the other set then the output of the NOR gate 215 is a "1". The specific inputs in this case are the set of conductors AA (from accumulator AA) and the set of conductors SA (from the store register SA). For the particular system requirements the first comparator module 211 has its upper pair of inputs connected to the leads from the fourth bit position of each of the conductor sets AA and SA and its lower pair of inputs to the eighth bit positions; while the inputs for the other three comparator modules run from the ninth bit position of each set at the upper inputs of module 212 to the leads from the 20th bit position of each set at the lower inputs of module 214; corresponding to the last three digit positions of the data stored in the accumulator AA and the storage register SA.

The three comparator modules 221–223 along with NOR gate 225 are used in a similar manner to compare the contents of the last three digit positions of the accumulator AB with a wired constant. The specific constant shown has the value $\theta$B1 corresponding to the binary number 1010 1011 0001, with the 1's and 0's provided by open circuit and ground potentials respectively. Thus if a five digit number is stored in the accumulator AB, the first two digits may be any value as far as operation of comparator is concerned which may be indicated by an X; so that the output of NOR gate 225 has the value of "1" if the contents of the accumulator AB has the value XX$\theta$B1. This signal appears on the lead COP9 in FIG. 2.

To appreciate the significance of the particular constant, please note that the 16 possible values for the four-bit binary coded digit are as explained in column 7 of the Duthie et al patent are 0 for the null value 0000, followed by the values 1–9, then $\theta$ for the value 1010 followed by the values B–F in which the bits have the weight 8–4–2–1. The symbol $\theta$ is used to correspond to the 0 of telephone directory numbers because it is usually transmitted as 10 pulses in dialing. Thus each digit position of a directory number may have any one of the 10 values 1–$\theta$, and for a block of a thousand numbers they may have the value X111–X$\theta\theta\theta$. Thus if a block of one thousand numbers is being scanned the last number would have the value X$\theta\theta\theta$. The operation of the counting circuits is such that the last three digits for the next count would have the value $\theta$B1; so that this constant indicates that all thousand numbers have been scanned and the counter has advanced to the next step.

An option is provided in the comparison circuits to connect the output of the comparator module 221 via a strap 250 to a ground terminal, which has the effect of eliminating the corresponding digit from the comparison so that only the last two digits are compared and the constant becomes equal to XXXB1, which permits one hundred numbers to be scanned at a time.

The J inputs of both sets of comparator circuits 211–214 and 221–223 are connected via the output of an inverter 210 from the conductor OP9 from the instruction register decoder. The outputs from the two NOR gates 215 and 225 are connected to respective inputs of an OR gate 230, the output of which is connected to a conductor EOP9. Thus when the signal OP9 is "1;" and when the contents of accumulator AB has its last three digits (or two digits if the wired option is used) are equal to the constant the signals on leads COP9 and EOP9 both become "1;" and when the contents of accumulator AA compare to the contents of the store register SA the output of NOR gate 215 is "1" which causes the signal on lead EOP9 to also be "1."

In an alternative embodiment not shown the inputs for the constant at the comparator modules 221–223 may be connected to the outputs of another temporary memory register, so that any desired constant may be stored therein under programmed control for use in making the comparison.

Figure 3:
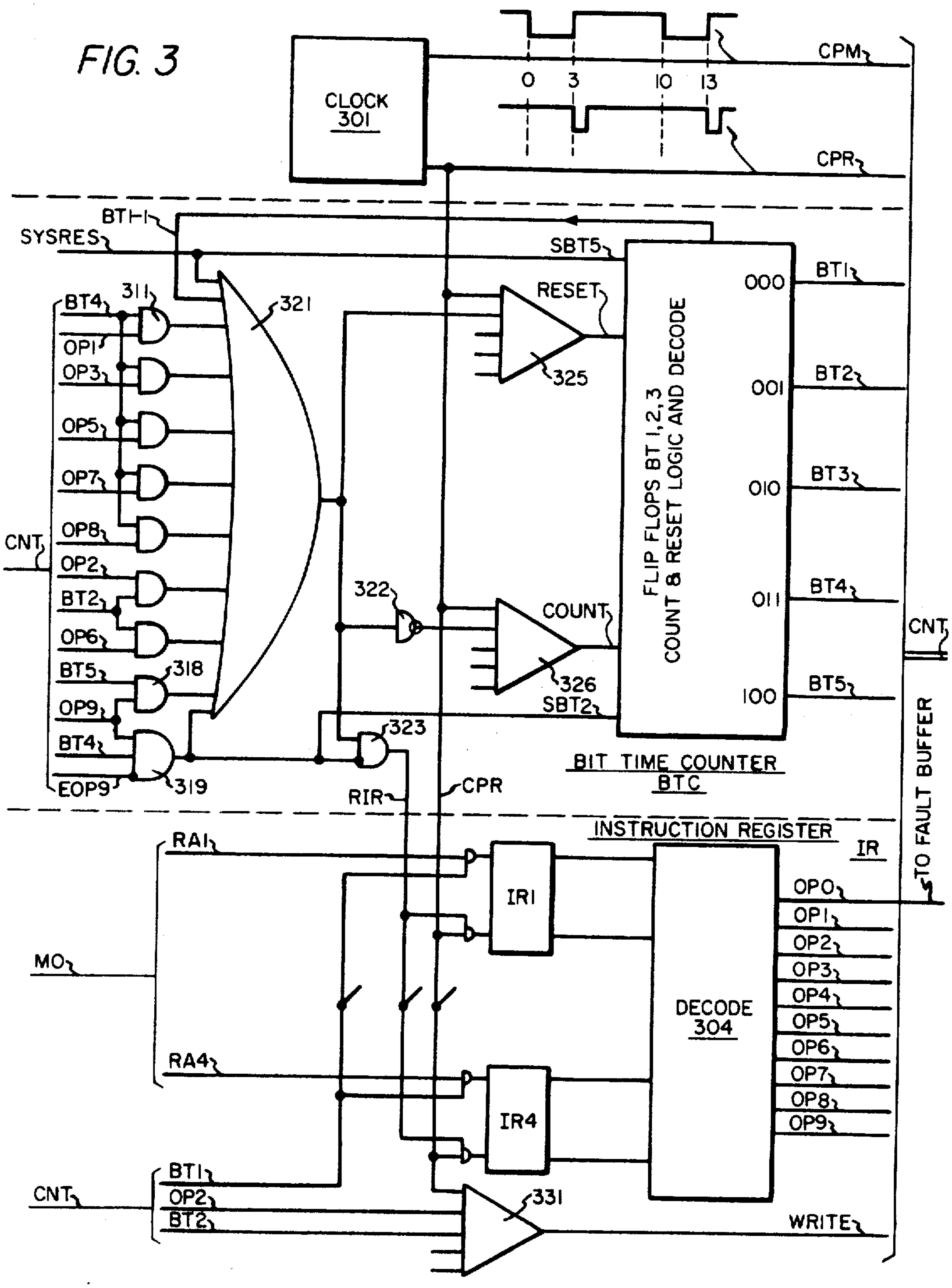
FIGS. 3–7 are functional block diagrams of the registers and logic circuits of other portions of the central processing unit, of the memory, and of general storage registers.
Figure 4:
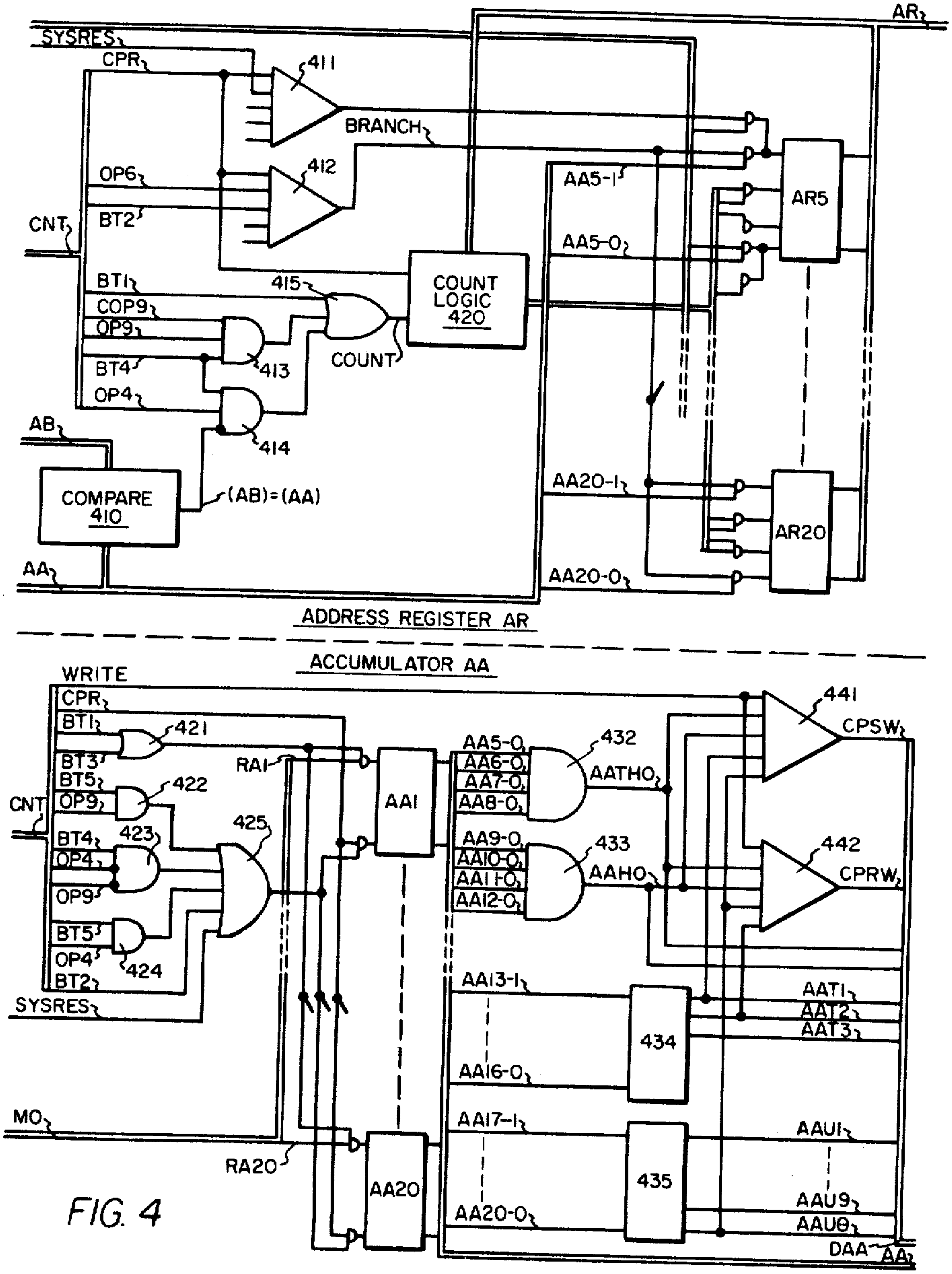

In FIG. 3 the clock is shown as block 301 which supplies the recurring pulse trains as indicated by the graphs on lead CPM and CPR. The pulses on lead CPM are used principally to enable the memory driver circuits, and the pulses on lead CPR are used as AC inputs to the gated pulse amplifiers and the coincidence gates of the flip-flops to control the timing of the change of state.

The bit time counter BTC counts from one to five. Every operation (OP) code begins with bit time BT1 and the counter advances by one on every CPR clock pulse. However some operations can be conducted in fewer bit times than others. The counter comprises three flip-flops BT1, BT2, and BT3, which along with the counting and reset logic and decoding circuits is represented by block 310. The states of the flip-flops for each output state are shown along the right side of this block, the state 000 being decoded as output BT1, etc. up to the state 100 being decoded as output BT5. The counter advances by one or resets on each pulse from lead CPR as controlled by the gated pulse amplifiers 325 and 326. Normally the output of OR gate 321 is at the level "0" so that the gated pulse amplifier 325 is inhibited and gated pulse amplifier 326 is enabled via inverter 322, so that the counter advances on each occurrence of a pulse on lead CPR. Reset is controlled by gates 311–319 connected to the inputs of OR gate 321. State BT4 causes resetting for codes OP1, OP3, OP5, OP7 and OP8; state BT2 causes resetting for codes OP2 and OP6, and for code OP9 the resetting may occur either with state BT4 or BT5. Also any time the flip-flop BT1 is in the set state, which will only occur for state BT5, the signal on lead BT1–1 will cause reset. The system reset signal on lead SYSRES also enables the reset and via the signal on lead SBT5 in conjunction with the signal on lead RESET forces the counter to state BT5. A signal on lead SBT2 in conjunction with the signal on lead RESET will force the counter to state BT2.

Code OP9 is the only operation code which will cause the bit time counter to reset to a state other than BT1. If comparison is not found, that is the contents of accumulator register AA are not the same as the contents of the storage register SA, and the address in the accumulator AB is not equal to the constant, then the signal on lead EOP9 is at "0;" so that during the state BT4 gate 319 has at its output the signal condition "1." This causes the signals on leads SBT2 and RESET to be "1" so that the counter is set to state BT2. When either comparison indicates equality, then the signal on lead EOP9 is at signal level "1" so that gate 319 is inhibited and the counter advances to state BT5. Then on the next clock pulse the output from gate 318 will produce the reset condition to change the state to BT1. Thus it may be seen that when the central processor is in the state with code OP9, which is the SCAN mode, the bit time counter recycles skipping state BT1 and goes directly from state BT4 to BT2. Since state BT1 is the state for reading instructions from the memory, no instruction is read and the processor remains in the same state OP9.

The instruction register IR comprises four flip-flops IR1–4. This register receives information in parallel from the memory output read amplifiers via leads RA1–4 during interval BT1, the signal on lead BT1 supplying the DC input to the set coincidence gates, and the signals on leads RA1–4 supplying the AC inputs to load the flip-flops. The information stored in these flip-flops is the operation (OP) code, which is decoded by the logic 304. The output on lead OP0 is an invalid code which indicates that an instruction was not read, probably due to an open diode or other fault in the memory; so this output is used by the fault buffer. The outputs OP1–OP9 correspond to the operation code previously described. Since the digit comprises four bits the output could be expanded to a maximum of 15 outputs other than the zero output. One such additional output OPB is shown.

A reset control from gate 323 associated with the bit time counter BTC provides a means of setting the instruction register back to zero after the execution of each instruction by supplying a DC input to the reset coincidence gates, with the lead CPR connected to the AC inputs to clock the reset. Note that the reset command is supplied whenever a signal is received from the OR gate 321 for resetting the bit time counter flip-flops; except that it is inhibited by the output of gate 319 during the SCAN operation for code OP9. This permits the instruction register to remain set at the state OP9 while the bit time counter cycles skipping the interval BT1.

A gated pulse amplifier 331 enabled by DC signals on leads OP2 and BT2 gates a clock pulse from lead CPR to generate a signal on lead WRITE, which is used to write the information into the temporary memory flip-flops during the STORE operation.

The outputs of the clock 301, the bit time counter BTC and the instruction register IR are shown combined as a set of conductors CNT, at least some of these signals being used by most of the other blocks of a central processing unit and also the memory input register.

The address register AR in FIG. 4 stores the address to be executed next. It comprises flip-flops AR5–20 and associated logic circuits. The count logic circuits 420 cause the address to be incremented by one during the occurrence of a pulse on lead CPR when the signal on lead COUNT is "1," which occurs via OR gate 415 every cycle during the first bit time interval by the signal on lead BT1, and also conditionally during interval BT4 for the execution of codes OP4 and OP9.

The compare logic for code OP4 shown as block 410 (which is not part of the address register but is shown here for convenience) compares the contents of the accumulator registers AA and AB, and supplies an output signal which inhibits gate 414 when the comparison indicates that the contents are equal. Thus if a comparison is true the register advances only once during the cycle on the occurrence of a signal on lead BT4 as normal and the next instruction in sequence is executed next; while if the comparison indicates an inequality of the two sets of data, gate 414 is not inhibited so that during the occurrence of signal on lead BT4 the register is advanced an additional step causing one instruction to be skipped.

During the SCAN operation (OP9) the address register is incremented once during the first cycle when the instruction is read during the interval BT1 as normal, and during subsequent cycles the interval BT1 is skipped by the bit time counter so that the address register does not advance further. The end of the operation occurs when a comparison is found in FIG. 2 either via gate 215 or 225, which can never occur at the same time. A "1" output from gate 215 indicates that the associative search has been completed by finding the word having the data corresponding to that in the register SA; in which case no further signal is supplied to the address register and the instruction already there is used next. However, if the address stored in accumulator AB which corresponds to the wired constant is reached, then the signal on lead COP9 at gate 413 during the occurrence of interval BT4 causes the address register to be incremented one additional step, so that an instruction is skipped. This causes entering a segment of a program to store data indicating that the search should be continued at a later time in the program, or that the search is to be terminated upon not finding a matching condition.

The branch instruction command OP6 along with the signal on lead BT2 is used to enable gated pulse amplifier 412 to pass a pulse from lead CPR to supply AC signals to set and reset inputs of the flip-flops to load data from the accumulator AA.

In addition the reset signal on lead SYSRES enables gated pulse amplifier 411 to supply reset signals to set the register to designated start addresses for the main or standby programs.

The accumulator AA comprises 20 flip-flops AA1–20. This register receives the information in parallel from the memory output read amplifiers via the twenty leads RA1–20 to the AC set inputs; the DC inputs being enabled during bit time intervals BT1 and BT3 via OR gate 421. The register is reset by a pulse on lead CPR when the reset DC inputs are enabled by a signal from OR gate 425; which occurs during interval BT2 of every cycle, during interval BT5 for the codes OP9 and OP4 via gates 422 and 424 respectively, during interval BT4 for all other operation codes via gate 423, and also when the system reset signal is present on lead SYSRES.

The output of accumulator register AA is also used for the STORE operation code OP2 during the interval BT2 as the operand address indicating into which register the information from accumulator AB is to be written. The output for the digit AA5–8 is decoded by gate 432 as the thousands digit on lead AATH0, and for the digit AA9–12 by gate 433 as the hundreds digit on lead AAH0, since these two digits for the temporary addresses are always 00. The digit AA13–16 is decoded by logic 434 to provide the tens digits AAT1, AAT2, or AAT3; and the digit AA17–20 is decoded by logic 435 to provide a units digit signal on one of the leads AAU1–AAU*θ*.

Figure 5:
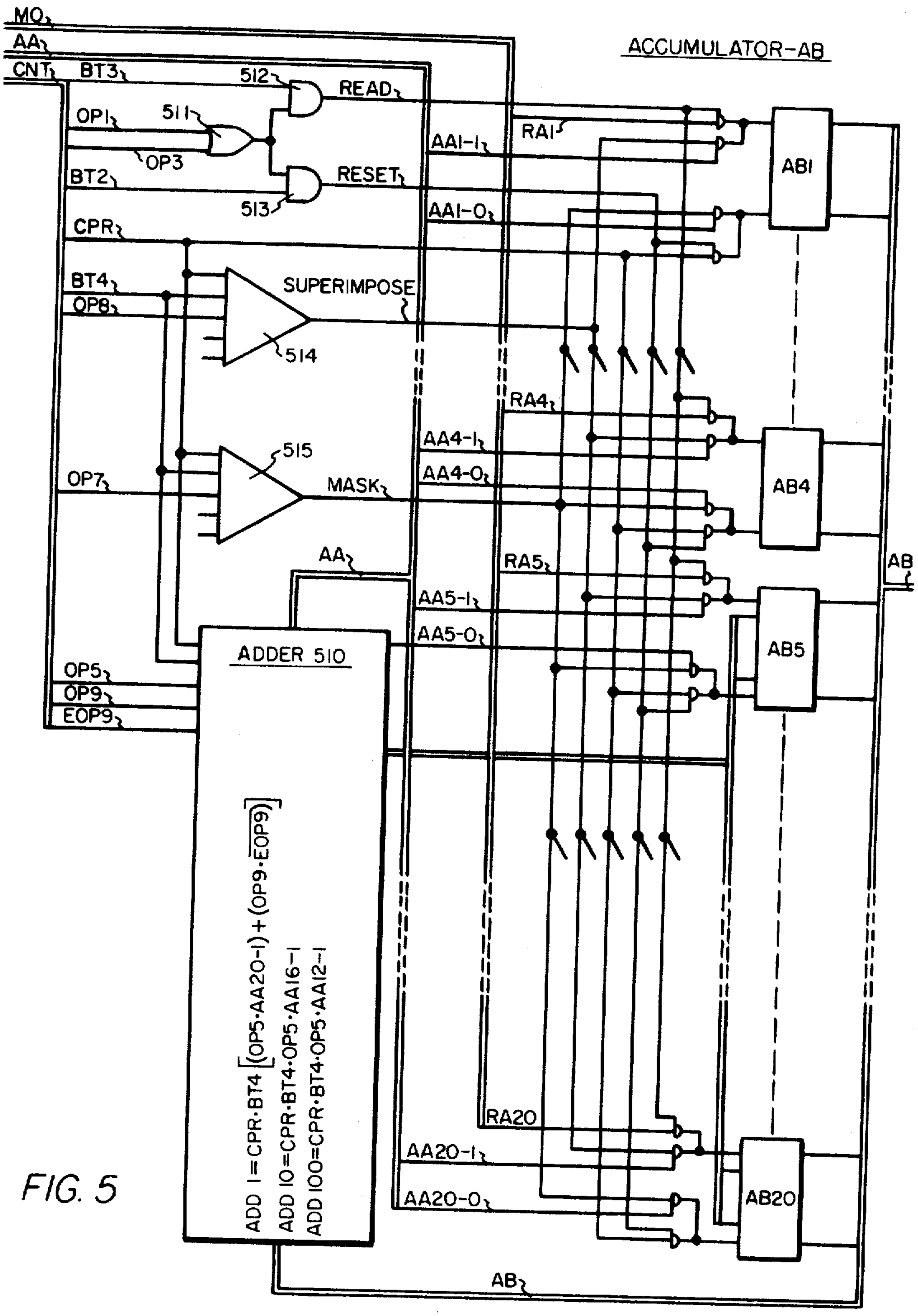

The accumulator AB shown in FIG. 5 comprises 20 flip-flops AB1–20. This register stores the output result for most of the operations, and also supplies part of the input data for many of them.

For the load and transfer operations, accumulator AB receives information directly from the memory output read amplifiers via the conductors RA1–20 to the AC inputs of one set of coincidence gates. For these operations the code OP1 or OP3 via OR gate 511 enables gates 512 and 513 so that during the bit time interval BT2 gate 513 supplies DC reset commands to a set of coincidence gates to reset all of the flip-flops on the occurrence of a pulse on lead CPR, and then during the interval BT3 gate 512 supplies a read command to the DC inputs of the set coincidence gates to load the information from the memory output.

Adder logic 510 provides the addition logic indicated by the Boolean equations within the box. This logic includes set and reset coincidence gates for the flip-flops AB5–20 having AC inputs from lead CPR, and logic for the DC inputs thereof which is actuated during bit time BT4 to add 1, 10 or 100 to the contents of the flip-flops AB5–20. For the add operation OP5, the data 1, 10 or 100 is stored in accumulator AA as a bit in the corresponding one of the flip-flops AA20, AA16 or AA12 respectively. For the SCAN operation OP9, the address in flip-flops AB5–20 is incremented by one during bit time BT4 as long as the signal on lead EOP9 has a value "0."

The mask and superimpose operations OP7 and OP8 control the gated pulse amplifier 515, 514 respectively during the interval BT4 to supply a clock pulse from lead CPR to the AC inputs of coincidence gates to cause information from accumulator AA at the DC inputs of the coincidence gates to be masked via reset inputs, or superimposed via set inputs respectively.

The memory input register MI comprises flip-flops MI5–20, as shown in FIg. 6. The instruction for the next cycle is transferred from the address register AR via the leads AR5–1 to AR20–0 inclusive connected to the DC inputs of respective coincidence gates; which are clocked via signals from gated pulse amplifier 631 when enabled by a DC signal from OR gate 625, which occurs during bit time BT2 for code OP2 via gate 621, during bit time BT5 during codes OP4 or OP9 via gates 623 or 624 respectively, and for other codes during bit time BT4 via gate 622.

The data address from accumulator AB is transferred via DC inputs of set and reset coincidence gates which receive AC input pulses from gated pulse amplifier 632 when enabled during bit time BT2 and the operation codes OP3 or OP9 via OR gate 626.

The data address from accumulator register AA is transferred via DC inputs of set and reset coincidence gates which are clocked via a signal from gated pulse amplifier 633 when enabled during bit time BT2 and any of the operation codes OP1, OP4, OP5, OP6, OP7 or OP8 via OR gate 627. The output of the memory input register is decoded via the circuits 610 comprising logic circuits 611 for the first address digit from flip-flops MI5-8, decoding logic 612 for the second address digit from flip-flops M19–12, via decoding logic 613 for the third digit from flip-flops MI13–16, and decoding logic 614 for the fourth digit from flip-flops MI17–20. The first two digits are used by the memory drivers 602 which require an enabling clock pulse on lead CPM. The last two digits are used by the memory switches 603.

As shown in FIG. 7, a storage register SA comprising flip-flops SA1–20 has an address 0021, a storage register SB comprising flip-flops SB5–20 has an address 0022, a storage register SC comprising flip-flops SC5–20 has an address 0023, and a storage register SD comprising flip-flops SD5–20 has an address 0024. Data may be stored in these registers from the accumulator AB via connections to the DC inputs of set and reset coincidence gates as shown. During the store operation in interval BT2 the signal on lead WRITE from gated pulse amplifier 231 (FIG 3) supplies a clock pulse to the four gated pulse amplifiers 721–724. If one of these gated pulse amplifiers has its address stored in accumulator AA the signals from the set of conductors DAA via bus AB–B enables its DC inputs so that the clock pulse is gated to the AC inputs of the coincidence gates of the corresponding storage register to cause a transfer of the data from accumulator AB. To load information from one of these storage registers into the accumulator AB during the load operation one of the storage readout circuits SR21–SR24 is used. These storage readout circuits are disclosed in said Memory Arrangement patent application by R. M. Thomas. Each of them has an input shown via bus RA-B from the memory driver MD00, and from the memory switches on one of the leads MS21–MS24 corresponding to the last two digits of its address. When both the memory driver and the memory switch of one of the storage readout circuits is enabled the data from the corresponding storage register is supplied via the set of conductors comprising bus RA–B to the read amplifiers 102 (FIG. 1) and then via the memory output bus MO to accumulator AB.

The output from the flip-flops SA1–20 is also supplied via the set of conductors SA to the scan unit 200 for use in the SCAN operation OP9.

Special storage readout circuits SR51 and SR52 are also provided for shift left and shift right operations using the contents of storage register SA. Thus the load instruction OP1 with address 0051 (instruction 10051) will cause the contents of the storage register SA to be loaded into accumulator AB shifted one digit (four bits) to the left, that is the bits SA5–20 are loaded into flip-flops AB1–16 and zero's are loaded into flip-flops AB17–20.

In like manner the storage readout circuit SR52 may be used to shift the information from storage register SA one digit (four bits) to the right. Thus the instruction 10052, which provides the code OP1 and the address 0052, causes the storage readout circuit SR52 to be enabled to transfer the information from flip-flops SA1–16 into the accumulator register AB flip-flops AB5–20, and digit zero will appear in flip-flops AB1–4.

Note that for additional parallel shift operations, the contents of accumulator AB must be stored in storage register SA before the shift instruction is repeated.

Indirect Addressing of Registers, Senders and Automatic Number Identification units Indirect addressing with permanently wired addresses is used for the registers, senders and automatic number identification units shown as block 130 in FIG. 1. The indirect addressing apparatus comprises gated pulse amplifiers 441 and 442 shown in FIG. 4, and the store registers SB and SC along with decoding circuits 731–735 shown in FIG. 7. Indirect addressing is used only for the write-control operation using the STORE code OP2; direct addressing of the same store registers being used for the read-control operations using the LOAD code OP1 or the TRANS code OP3. The operand addresses 001θ and 002θ are used for indirect addressing, which enable the gated pulse amplifiers 441 and 442 respectively. Thus the output of decoding gate 432 supplies the signal AATHO supplying the thousands digit, decoding gate 433 supplies the signal AAHO which is the hundreds digit, the decoding circuits 434 supply the tens digits AAT1 and AAT2, and the decoding circuits 435 supply the units digits AAUθ for the D.C. inputs of these gated pulse amplifiers. During a STORE operation the gated pulse amplifier 331 (FIG. 3) is enabled by the signals on leads OP2 and BT2 to gate the clock pulse on lead CPR to the lead WRITE, connected to the clock pulse inputs of the gated pulse amplifiers 441 and 442, which have the respective output leads CPSW and CPRW. Thus when one of these gated pulse amplifiers is addressed during a STORE operation a clock pulse appears on its output.

The address of a store being indirectly addressed is placed in either store register SB or store register SC. As shown in FIG. 7 the store register SB comprises flip-flops SB5–SB20, with the output of flip-flops SB13–SB16 being decoded by circuits 731 to supply the tens digits SBT1–SBT6, and the output of flip-flops SC5–SC20, with the thousands digit from the output of flip-flops SC5–8 decoded by circuit 733 to supply either the thousands digit SCTHO or SCTHC, the output of flip-flops SC13–16 is decoded by circuit 734 to supply the tens digit on one of the six output leads SCT6–SCTB, and the output of flip-flops SC17–20 is decoded by circuit 735 to supply the signal on one of the ten output leads SCU1–SCUθ.

For purposes of the STORE operation, the stores of the registers, senders and automatic number identification units may be grouped into two sets, one set comprising a directory number store and an equipment number store for each of 22 dial registers; and the other set comprising a directory number store and a sender number store for each of eight automatic number identification units, and four stores for each of ten senders. Each of these stores has its own individual gated pulse amplifier which may be designated as an "input control gate" for the store, with the gated pulse amplifiers 441 and 442 designated as "special control gates" for indirect addressing. Each of the gated pulse amplifiers such as 1011 for the set of stores associated with the dial registers has its clock pulse input connected to lead CPRW and has individual inputs from the store register SB decoding circuits for the tens and units address digits. The thousands and hundreds digits for all of these stores are CO and therefore the decoding connections are not necessary, but could be decoded and connected to the gated pulse amplifiers if desired.

Programming with Indirect Addressing

To store information into one of the dial register directory or equipment number stores, the address of the store is first placed in the store register SB using the assembler instruction STORE SB, (machine instruction 20022), and then instruction STORE RG (machine instruction 2002θ) is used which in execution enables the gated pulse amplifier 442 to supply a pulse via lead CPRW to the gated pulse amplifiers of all of the dial register stores, the one designated by the tens and units digits decoded from STORE SB being enabled to store the data from the accumulator into the store addressed. Similarly to store data into any one of the sender stores or ANI stores, the address of the store is first placed in store register SC, using the instruction STORE SC (machine instruction 20023), and then the instruction STORE SN (machine instruction 2001θ) is used, which in execution enables the gated pulse amplifier 441 to gate a pulse via lead CPSW to all of the gated pulse amplifiers of the sender and ANI unit stores, the one with the decoded address digits from store SC being enabled to store the data from the accumulator AB via the store bus into the addressed store. To place data from any one of the register, sender, or ANI unit stores into the accumulator, the transfer operation code TRANS (OP3) is used. In this operation, program instructions are first used to place the address of the desired store into the accumulator AB, and then the transfer operation instruction causes the data at that address to be read into the accumulator AB.

Note that with the indirect addressing technique described herein, it is not necessary in the program to use actual addresses of the stores of the registers, senders, or ANI units except for the first and in some cases the last numbered one. The program can be written in a loop with the store number appropriately incremented in performing various operations, and then the indirect addressing program technique for write-control, or the transfer operation for read-control, is used to write information into the appropriate store or read it out therefrom.

The various store addresses using the memory drivers MD00, (the thousands and hundreds digits), are as follows:

STORES

| Units.... | 1 | 2 | 3 | 4 | 5 | 6 | 7 | 8 | 9 | 0 | |
|---|---|---|---|---|---|---|---|---|---|---|---|
| Tens: | | | | | | | | | | | |
| 1..... | MA | MB | MC | MD | ME | MP | TA | TB | TC | SN | Marker stores. |
| 2..... | SA | SB | SC | SD | | | | | | RG | Temporary stores. |
| 3..... | PA | PB | PC | PD | PE | PF | PG | PH | PJ | | Printer stores. |
| 4..... | XA | XB | XC | XD | | | | | TR | TD | Rotary switches. |
| 5..... | SALF | SART | | | | | | | | | |
| 6..... | ANI #1 | ANI #2 | ANI #3 | ANI #4 | ANI #5 | ANI #6 | ANI #7 | ANI #8 | ANI #9 | ANI #10 | ANI sender number store. |
| 7..... | ANI #1 | ANI #2 | ANI #3 | ANI #4 | ANI #5 | ANI #6 | ANI #7 | ANI #8 | ANI #9 | ANI #10 | ANI directory number store. |

Register-Sender and ANI Apparatus

Figure 8:
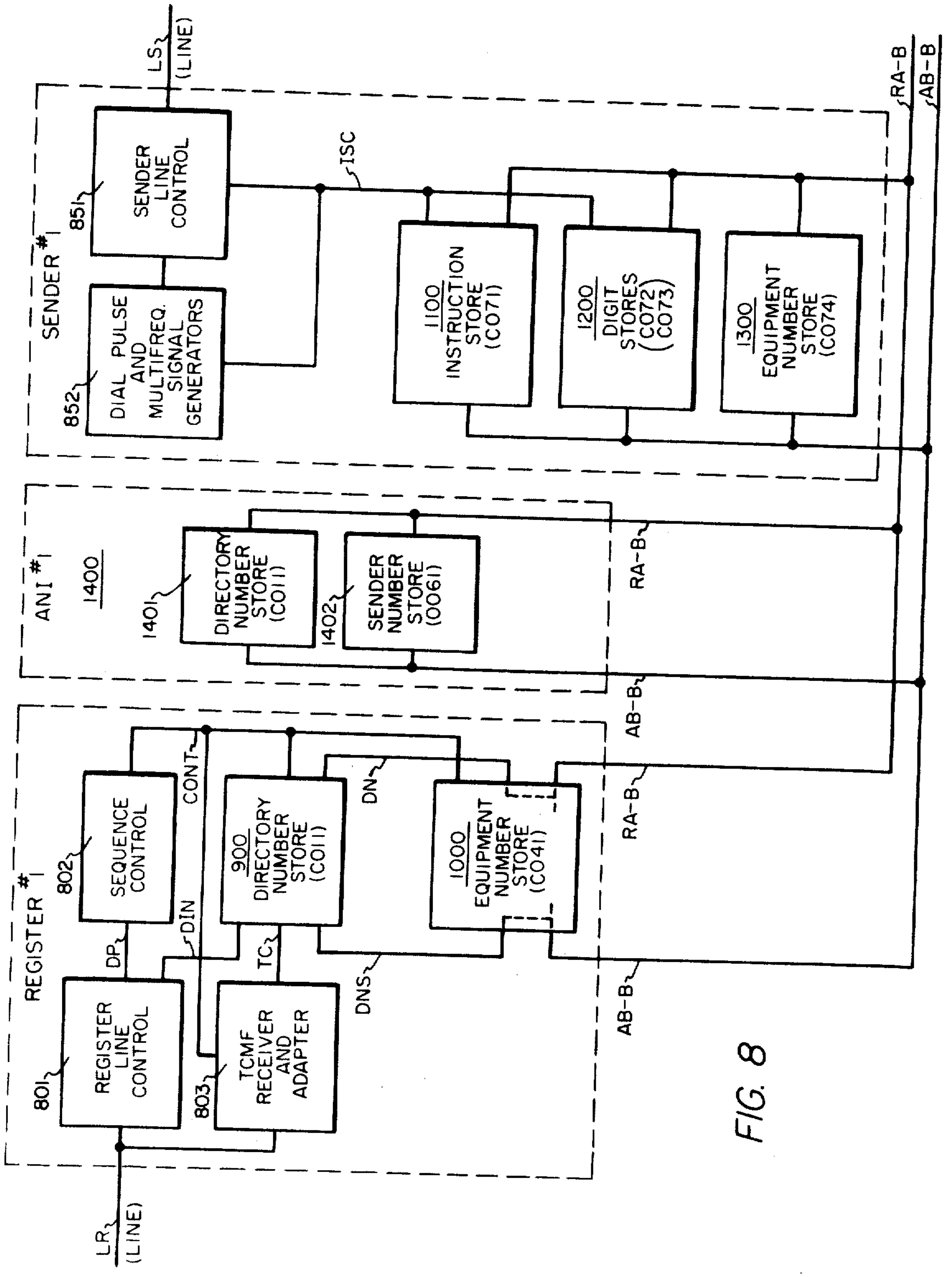
FIG. 8 is a single line block diagram of one register, one sender, and one automatic number identification unit.

FIG. 8 is a single line block diagram of one of the dialing registers, one of the senders and one of the automatic number identification (ANI) units. Each of the registers has a directory number store 900 and an equipment number store 1000 which for register No. 1 have the addresses CO11 and CO41 respectively; and also a register line control circuit 801, sequence control circuit 802 and a touch calling receiver and adapter 803.

Each of the senders includes an instruction store 1100, two digit stores 1200 and an equipment number store 1300 which for sender No. 1 have the addresses CO71, CO72, CO73 and CO74 respectively; and also a sender line control circuit 851 and circuits for dial pulse and multifrequency signal generators 852.

Each of the automatic number identification units 1400 has a directory number store 1401 and a sender number store 1402 which for ANI unit No. 1 have the addresses 0071 and 0061 respectively.

Each of the stores is coupled to the store bus AB–B to store data therein from the accumulator, and to the load bus RA–B to read data from the stores into the accumulator.

The store address numbers for registers and senders, which use the memory driver CO (the thousands and the hundreds digits of the address) are as follows:

REGISTER NUMBERS (22 Registers)

| Reg. | DN | EN |
|---|---|---|
| 1 | CO11 | CO41 |
| . | . | . |
| . | . | . |
| . | . | . |
| 10 | CO1θ | CO4θ |
| 11 | CO21 | CO51 |
| . | . | . |
| . | . | . |
| . | . | . |
| 20 | CO2θ | CO5θ |
| 21 | CO31 | CO61 |
| 22 | CO32 | CO62 |

SENDERS (10 Senders)

| Sender | IS | DS No. 1 | DS No. 2 | EN | Spare |
|---|---|---|---|---|---|
| 1 | CO71 | CO72 | CO73 | CO74 | CO75 |
| 2 | 81 | 82 | 83 | 84 | 85 |
| 3 | 91 | 92 | 93 | 94 | 95 |
| 4 | COθ1 | COθ2 | COθ3 | COθ4 | COθ5 |
| 5 | B1 | B2 | B3 | B4 | B5 |
| 6 | 76 | 77 | 78 | 79 | 7θ |
| 7 | 86 | 87 | 88 | 89 | 8θ |
| 8 | 96 | 97 | 98 | 99 | 9θ |
| 9 | θ6 | θ7 | θ8 | θ9 | θθ |
| 10 | B6 | B7 | B8 | B9 | Bθ |

The stores designated with an M are a part of the marker, the stores designated with a P are associated with the printer sub-system, the stores designated with an X are rotary switches on the control panel, stores TA, TB and TC are peg count buffers, store TR is for a test routine request, and store TD is for the traffic distributor. The symbol RG is a register write mnemonic for the address 002θ, and the symbol SN is a sender write mnemonic for the address 0010.

MEMORY EXPANSION

FIGS. 1 and 6 show, in block diagram form, the memory drivers and memory switches for address input to the memory. Detail circuits of the memory drivers and memory switches and the manner of connecting them to the memory is shown in said Memory Arrangement patent application by R. M. Thomas. As shown in FIG. 6, the output from the memory input flip-flops MI5–MI20 are decoded by circuits 611–614. The thousands digit from decoder 611 and the hundreds digit from decoder 612 may each have any of the 16 values 0 through F on individual leads from each decoder. Each memory driver has one thousands input, one hundreds input and a clock pulse input. The tens digit from decoder 613 may have any of the 12 values 1 through C, and the units digit from decoder 614 may have any of the 10 values 1 through θ. Each memory switch has two inputs, one for a tens digit and the other for a units digit. Thus there are a total of 120 memory switches. The memory is divided into sections each having certain drivers, and the switches are used in common by all sections.

In the organization of the memory the one hundred driver addresses having thousands digits 1 through θ and hundreds digits 1 through θ is reserved for use in the directory number section which is used for translations from a directory number of a called line to the line or trunk equipment number thereof. The equipment number section has been assigned the thousands digits C and D with the hundreds digits 1 through C comprising a maximum of 24 drivers, this section section being used for status information and class of service of lines, trunks and junctors. A section designated SR uses the driver having the thousands digit and hundreds digit of zero, which are used for the storage registers SA, SB, SC and SD, the marker registers, the ANI stores, and other temporary memory addresses. An R section uses the driver having the thousands digit C and the hundreds digit 0 for the register and sender stores. A T section for tables uses addresses such as those having thousands digits 1 through θ and hundreds digit 0, and others, which is used for various tables of information. A program switch section designated Q uses the driver having the thousands digit B and hundreds digit 0 for certain program switches on the console. The section designated P for program and literals was allotted the drivers having thousands digits 0, B, E and F and the hundreds digits 1 through C, which provided a maximum of 5760 words of program. While this was an adequate number of words for the initial programming of a telephone switching exchange, it eventually became apparent that future requirements would require expansion beyond the number of words available.

Figure 10:
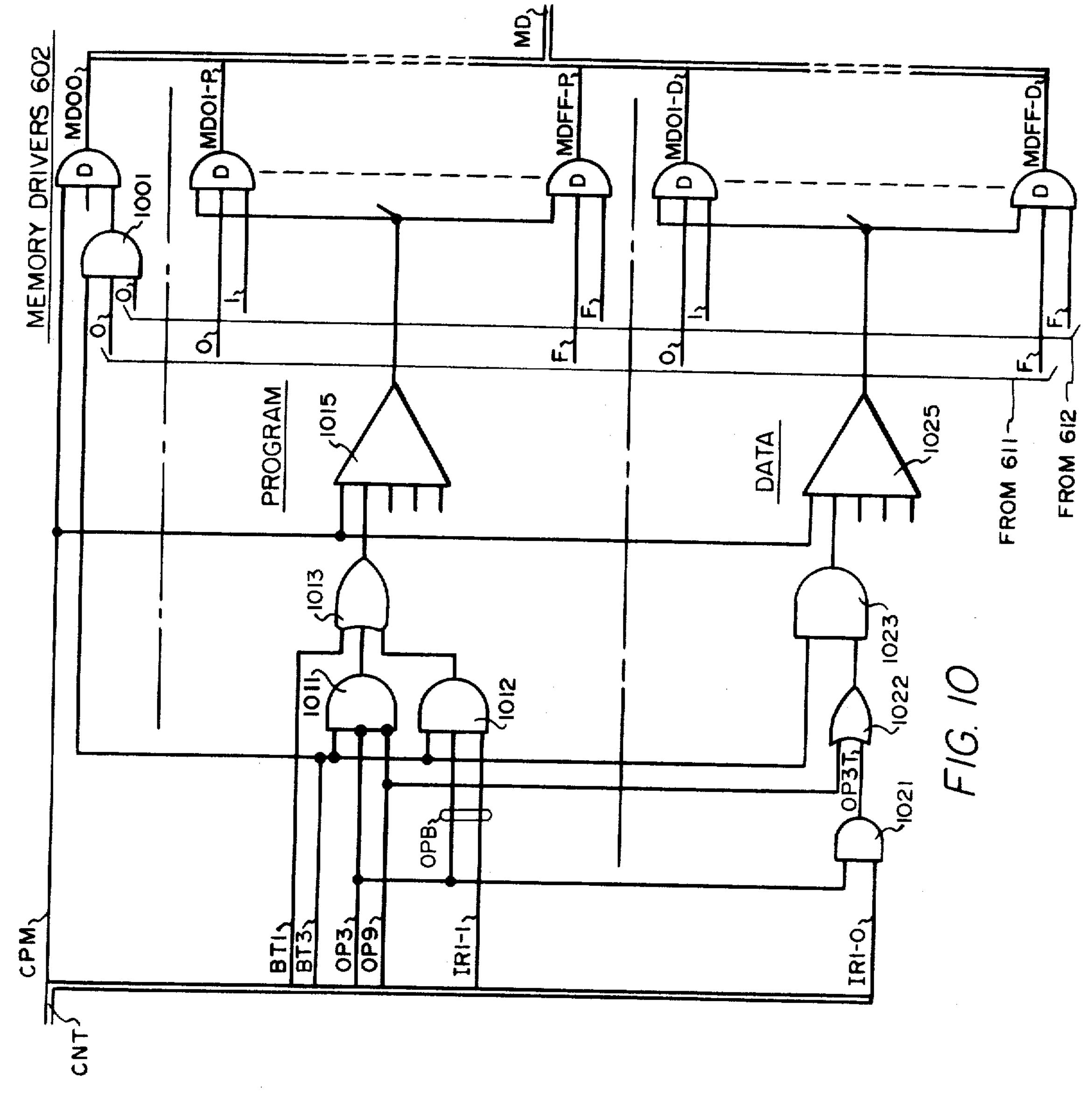
FIG. 10 is a functional block diagram of the memory drivers, including the block selection logic.

Therefore, as shown in FIGS. 6 and 10 a paging technique is used which effectively doubles the addresses available, with the extra addresses being used for program. This paging scheme in effect creates two blocks of memory with identical addresses. The two blocks of memory are designated the P (program) block and the D (data) block.

With two blocks of memory present in the machine, each with identical addresses, not only the address but also the block must be specified when information is required from memory. Basically with the present system this may be accomplished by accessing the P block on bit time BT1 and the D block on bit time BT3. However it was decided that operand addresses for literals should be incorporated in the P block rather than the D block, since the maximum number of literals could not be predicted, and a large portion of the D block has already been allocated. The operation codes in which the operand designates an address whose contents may contain a literal are those constituting the input of OR gate 627 in FIG. 6, in which the address is obtained from accumulator AA during bit time 2 and placed in the memory input flip-flops MI, the output of the designated address being placed in the accumulator AB during bit time BT3.

Basically the contents of data block addresses are obtained by first placing the address in accumulator AB and then using the operation TRANS code to obtain the contents of that address. In addition the SCAN operation code OP9 is used to read the contents of directory number addresses which are in the accumulator AB. Therefore, designating the TRANS code as OP3T, the D block is basically accessed on (OP3T + OP9) (BT3), and the P block on (BT1) + $(\overline{OP3T})$ $(\overline{OP9})$ (BT3) + (OPB) (BT3), OP code B being a new OP code. The new OP code is provided so that the program, given a particular address in accumulator AB, can get the contents of that address in either the P or D block.

Figure 9:
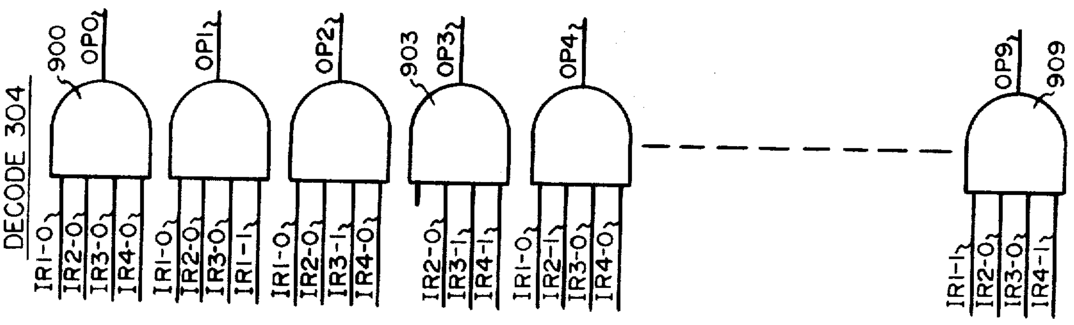
FIG. 9 is a functional block diagram of the operation code decoder of the instruction register.

The logic for selecting the appropriate block of memory is shown in FIG. 10. The memory drivers are designated by a gate symbol with a D therein. Each driver circuit has three inputs, the upper being a clock pulse input and the other two being address inputs. The program block of drivers comprises the 255 drivers having outputs MD01–P through MDFF–P, and the data block drivers comprise the 255 drivers having outputs MD01–D through MDFF–D. The address inputs are obtained from the decoding circuits 611 and 612 as shown. Note that each address denotes one of the drivers in the program block and one of the drivers in the data block. The appropriate block is selected by the clock pulse with the program block being supplied by the gated pulse amplifier 1015, and the clock pulse inputs for the data block drivers being supplied by gated pulse amplifier 1025. The clock pulse input for each of these gated pulse amplifiers is from clock pulse lead CPM. The program block gated pulse amplifier has a D.C. control input from OR gate 1013. The first input of this OR gate is from the signal on lead BT1 so that the program block is always selected during this bit time of the cycle. The selection of the block during bit time BT3 is determined by the other logic gates 1011, 1012, 1021, 1022 and 1023. Note that the code OP3 for the transfer operation TRANS, and the new code OPB designated FETCH both entail essentially the same hardware implementation except for the selection of the program block. The decoding circuits 304 for the instruction register are shown in FIG. 9. Each output uses an AND gate function having four inputs from the four instruction register flip-flops IR1, IR2, IR3 and IR4. However for gate 903 having output OP3, the input from flip-flop IR1 has been omitted. Thus the signal on lead OP3 actually becomes true not only for the code TRANS but also for FETCH, since codes 3 and B both have the value 011 for the outputs of flip-flops IR2, IR3 and IR4. Thus the use of the signal on lead OP3 may be left unchanged in FIGS. 1–6 except within the memory driver block 602. The true output for the operation code TRANS is shown in FIG. 10 as the output of gate 1021 and given the designation OP3T. The inputs of this gate are OP3 and the signal on lead IR1–0 from flip-flop IR1. The signal for the operation FETCH designated OPB is shown as the combination of two inputs to gate 1012, one being OP3 and the other being IR1–1. Thus OR gate 1022 is used to select the data block for the operation TRANS OP3T or the operation SCAN OP9, and AND gate 1023 provides the input on lead BT3. The combination at gates 1011 and 1012 provides for the selection of the program block during bit time BT3 on all other operation codes including OPB.

Since driver 00 is used both for constants in the marker stores MA, MB, etc. which are accessed using the LOAD operation code, and the same driver 00 is used for the ANI stores which are read using the transfer operation code; this driver is only accessed during bit time BT3, so AND gate 1001 is used to supply the input to one of the address inputs of this driver and the clock pulse input is obtained directly from lead CPM. Thus, in effect memory driver MD00 is assigned in both memory blocks and there can be no duplication of the addresses 00XX.

It should be noted that while memory driver MD00 is shown as a single driver, in actual practice three drivers are used in parallel with the same inputs and connected in common to the same output on lead MD00. Certain other driver addresses also use driver circuits in parallel. Also while one gated pulse amplifier 1015 is shown for the program block, and one gated pulse amplifier 1025 is shown for the data block, in actual practice there are a plurality of gated pulse amplifiers used for each block each supplying certain of the drivers in that block. The inputs for these gated pulse amplifiers within each block are connected in parallel, all having the same clock pulse input from lead CPM, and all of those in the program block having a D.C. input from gate 1013, and all of those in the data block having a D.C. input from gate 1023. However the outputs are not connected in parallel but are connected only to selected drivers within the block.

Thus with the memory divided into two blocks, the data block is used for the directory number addresses, the equipment number addresses, registers and senders, and tables; these comprising the data base of the office. The program block contains the program, literals and program switches Q. The ANI stores of the data block; and storage registers, marker stores, and others of the program block are accessed by memory driver MD00.

One use of the FETCH operation code is during dump programs, to permit any address to be derived, loaded into the accumulator AB, and then the contents of that address obtained, so that they may be supplied to the printer. If the address is in the program block, the contents are obtained with the FETCH operation, and if in the data block by the TRANS operation.

What is claimed is:

1. In a digital data processing system having a central processing unit and a memory;

wherein the memory comprises a plurality of word stores for program words and data words, the program words having a first part for an operation code and a second part for an operand, a memory input register for addresses designating the individual word stores, access means connected to read out a word from a store corresponding to the address in the memory input register and to supply signals representing the word to a set of memory output conductors;

wherein the central processing unit comprises memory output register means, an accumulator, an instruction register including an operation code decoder, arithmetic circuits, store registers, and interconnections among them and to the memory input register and memory output conductors, a clock, and operation cycling means driven by the clock to provide operation cycles comprising sequential states;

instruction reading means effective during a first state of each operation cycle using said access means to read out one program word from memory with the operation code into the instruction register and the operand into the memory output register means, means using the arithmetic circuits to perform an operation designated by the operation code, which for some operation codes includes data reading means effective during a subsequent state of the operation cycle for placing a data word address into the memory input register and using the access means to read out a corresponding data word into the memory output register means, and means effective during the operation cycle to place an address of a program word into the memory input register for the next operation;

the improvement wherein the memory is divided into a program block and a data block with identical addresses, wherein said access means includes program block addressing means and data block addressing means connected from the memory input register respectively to the program block and the data block, block selection means comprising first means and second means, the first means has inputs connected to outputs of the operation cycling means and instruction register and an output connected to actuate the program block addressing means during said first operation state and also during said subsequent operation state with given operation codes, the second means has inputs connected to outputs of the operation cycling means and instruction register and an output connected to actuate the data block addressing means during said subsequent operation state with other operation codes, so that said instruction reading means uses the first means to read program words from the program block, and said data reading means used the first means with said given operation codes to read data from the program block and the second means with said other operation codes to read data words from the data block.

2. In a digital data processing system, the combination as claimed in claim 1, wherein said given operation codes include a fetch operation code (OPB) and said other operation codes include a transfer operation code (OP3), gating means connected from the outputs of the accumulator to inputs of the memory input register actuated responsive to either the fetch or the transfer operation code (OP3=OPB+OP3T) during the operation cycle between said first state and said subsequent state to place a data word address into the memory input register.

3. In a digital data processing system, the combination as claimed in claim 1, wherein the memory addresses use a numbering system having a first and a second part for each address, memory address decoding means coupled to the output of said memory input register with the output of the decoding means having a first and a second group of address conductors for the two parts respectively, a plurality of memory drivers having inputs from the first group of conductors and a plurality of memory switches having address inputs from the second group of conductors each word of memory being selected by a unique combination of a driver and a switch;

wherein said memory drivers are divided into two blocks comprising respectively the program block addressing means and the data block addressing means, the outputs of each block of memory drivers being connected only to the corresponding block of memory;

wherein each memory driver further includes a pulse input and means responsive to a pulse on that input to actuate the driver to thereby read a word from memory in accordance with the address inputs which select one memory driver and one memory switch, and said block selection means further having inputs from the clock to enable the selected first means or second means to supply a signal on the pulse leads of the drivers of the program block or data block respectively.

4. In a digital data processing system, the combination as claimed in claim 3, wherein at least one of said memory drivers is connected to the clock and the address decoding means so that it may be selected independently of the block selection means to select corresponding memory addresses independently of the operation code.

5. In a digital data processing system, the combination as claimed in claim 3, wherein said first means and second means each includes pulse amplifier means, each having connections to a common memory-actuation clock pulse output (CPM) of the operation cycling means and each having a control input from logic means having inputs from the operation cycling means and from the instruction register and operation code decoder.

6. In a digital data processing system, the combination as claimed in claim 5, wherein at least one of said memory drivers is connected to the clock and the address decoding means so that it may be selected independently of the block selection means to select corresponding memory addresses independently of the operation code.

7. In a digital data processing system having a clock, a central processing unit and a memory, wherein the clock comprises means to generate recurring clock pulses on clock conductors in clock periods;

wherein the memory comprises a program block having a plurality of program word stores for storing the respective program words, a data block having a plurality of data word stores for storing respective data words, there being a fixed maximum number of bit positions in each word, with first (bits 1–4) and second (bits 5–20) parts comprising respective mutually exclusive bit positions of the words, each program word having an operation code as the first part and an operand as the second part, a memory input register for storing an address, memory drivers and memory switches having address inputs from the memory input register and outputs coupled to said word stores to select one corresponding to the address in the memory input register, means including a pulse on a clock conductor coupled to inputs of the memory driver to actuate the memory, memory output means coupled to the word stores to receive the word from the selected store upon actuation of the memory, and supply it as signals on a set of memory output conductors;

wherein the central processing unit comprises an operation cycle counter (BTC), an address register, an instruction register, a first accumulator (AA), a second accumulator (AB), a store register (SA), and arithmetic circuits;

the operation cycle counter (BTC) comprises bistable devices, counting and logic circuits interconnected to provide N operation states with an output for each state, including a first, a second, and successive states up to the Nth state, the operation cycle counter being coupled to the clock and to the operation code decoder to change the state once each clock period advancing to the next state during an operation and resetting to the first state at the end of an operation;

the arithemtic circuits comprise gating and logic circuits interconnecting said registers, with connections from the clock, operation cycle counter and operation code decoder to perform operations during specified operation states in accordance with the output of the operation code decoder, said operations including transferring words between registers and other logical functions;

the instruction register comprises bistable devices having inputs coupled via gating circuits to the memory output conductors for the first part of a word, the last said gating circuits having a connection to the operation cycle counter to place the operation code of a program word in the instruction register during said first operation state, and the instruction register including an operation code decoder connected to outputs of its bistable devices with an individual output from the decoder for each operation code;

the address register comprises bistable devices for storing an address of the program block and counting circuits with connections to the operation cycle counter to advance one count during each occurrence of the first operation state, and arithmetic circuit connections to selectively advance one count during certain operations, and gating means to transfer the contents of the address register to the memory input register before the end of each operation;

the first accumulator comprises bistable devices having inputs coupled to the memory output conductors to receive and store every word selected upon operation of said means to actuate the memory, the first accumulator having outputs coupled via gating means to the memory input register and to the address register to transfer the second part of the word as an address in accordance with the operation code, and the outputs being also coupled to other of the arithmetic circuits for operations in accordance with the operation code;

the second accumulator comprises bistable devices having inputs and outputs interconnected via the gating and logic circuits of the arithmetic circuits to the other registers and the memory output conductors to receive, modify, and supply words in accordance with the operation specified on the output of the operation code decoder;

the store registers comprise bistable devices coupled to the memory input means and memory output means with individual address;

the system being operative beginning each operation with an address of the program block in the memory input register and reading the corresponding word from its store during the first operation state (BR1) into the first accumulator and the first part of the word into the instruction register; performing operations during successive operation states in accordance with the operation code in the instruction register decoded by the operation code decoder, some operations including placing an address into the memory input register during the second operation state (BT2) and actuating the memory during the third operation state (BT3) to read the word into at least one of said accumulators, and every operation including placing the program address word from the address register into the memory input register for the next operations;

the improvement wherein the memory drivers are divided into a group for the program block of memory and a group for the data block of memory with drivers in the two groups having identical address inputs, wherein the memory switches are common to both memory blocks;

first means having inputs connected to outputs of the operation cycle counter and instruction register and an output connected to actuate the group of memory drivers for the program block during said first operation state and also during said third operation state with given operation codes, and second means having inputs connected to outputs of the operation cycle counter and instruction register and an output connected to actuate the group of memory drivers of the data block during said third operation state with other operation codes, so that said reading of a word during the first operation state uses said first means, and said actuating the memory during the third operation state to read the word makes use of said first means with said given operation codes and makes use of said second means for said other operation codes.

8. In a digital data processing system, the combination as claimed in claim 7, wherein said given operation codes include a fetch operation code (OPB) and said other operation codes include a transfer operation code (OP3T), gating means connected from the outputs of the second accumulator to inputs of the memory input register actuated responsive to either the fetch or the transfer operation code during said second operation state to place a data word address into the memory input register.

9. In a digital data processing system, the combination as claimed in claim 7, wherein said first means and said second means each include pulse amplifier means having outputs connected to inputs of the memory drivers for the corresponding memory block, the pulse amplifying means having a common pulse input to said clock conductor for actuating the memory, and control inputs from logic circuits which determine the selection of the appropriate block.

10. In a digital data processing system, the combination as claimed in claim 9, wherein said logic circuits include connections to the outputs of the operation cycle counter and the instruction register and operation code decoder, connected so that the control input of the pulse amplifier means for the program block is enabled during said first operation state, and during the third operation state for said given operation codes, and the control input of the pulse amplifier means for the data block is enabled by its control input during the third operation state for said other operation codes.

11. In a digital data processing system, the combination as claimed in claim 10, wherein said operation codes include a fetch code, wherein the operation code decoder has one of its outputs true for both the transfer and fetch operation codes, and this output is connected to the apparatus of the central processing unit to select an address from the second accumulator during the second operation state and place it into the memory input register, and to perform other functions common to these two operation codes; and wherein the logic circuits of said first means and second means include connections from the last said output of the operation code decoder and also directly from one instruction register bistable device to distinguish between the transfer and fetch operation codes so that the program block pulse amplifying means is enabled for the fetch operation during the third operation state, and the pulse amplifying means for the data block is enabled for the transfer operation code.

12. In a digital data processing system, the combination as claimed in claim 11, wherein at least one of said memory drivers has an input connected directly to said clock conductor to actuate the memory, so that it is actuated for its address independently of said first means and second means, and wherein the address input means for this driver includes a connection to the operation cycle counter to address it only during the third operation state.

13. In a digital data processing system, the combination as claimed in claim 7, wherein at least one of said memory drivers has an input connected directly to said clock conductor to actuate the memory, so that it is actuated for its address independently of said first means and second means, and wherein the address input means for this driver includes a connection to the operation cycle counter to address it only during the third operation state.

* * * * *